United States Patent
Kwon

(10) Patent No.: US 9,216,712 B1
(45) Date of Patent: Dec. 22, 2015

(54) AIRBAG APPARATUS

(71) Applicant: Hyundai Mobis Co., Ltd., Seoul (KR)

(72) Inventor: Hae Wook Kwon, Yongin (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/660,541

(22) Filed: Mar. 17, 2015

(30) Foreign Application Priority Data

Sep. 23, 2014 (KR) ........................ 10-2014-0126815

(51) Int. Cl.
*B60R 21/16* (2006.01)
*B60R 21/26* (2011.01)
*B60R 21/2338* (2011.01)
*B60R 21/239* (2006.01)

(52) U.S. Cl.
CPC ........... *B60R 21/2338* (2013.01); *B60R 21/239* (2013.01); *B60R 2021/2395* (2013.01); *B60R 2021/23382* (2013.01)

(58) Field of Classification Search
CPC ..................... B60R 21/239; B60R 2021/2395; B60R 21/2338; B60R 2021/23382
See application file for complete search history.

(56) References Cited

U.S. PATENT DOCUMENTS

| | | | | |
|---|---|---|---|---|
| 7,651,130 B2 * | 1/2010 | Bauberger | .......... | B60R 21/2338 280/743.2 |
| 7,784,828 B2 * | 8/2010 | Matsu | .................. | B60R 21/233 280/739 |
| 7,938,444 B2 * | 5/2011 | Williams | ............ | B60R 21/2338 280/728.2 |
| 8,191,925 B2 * | 6/2012 | Williams | ............ | B60R 21/2338 280/739 |
| 8,434,786 B2 * | 5/2013 | Jang | .................... | B60R 21/2338 280/739 |
| 8,646,808 B2 * | 2/2014 | Williams | .............. | B60R 21/239 280/739 |
| 9,027,956 B2 * | 5/2015 | Yamaji | .................. | B60R 21/203 280/729 |
| 2010/0102542 A1 * | 4/2010 | Nakajima | ............. | B60R 21/233 280/743.2 |

FOREIGN PATENT DOCUMENTS

| | | |
|---|---|---|
| EP | 1 980 453 | 10/2008 |
| JP | 5286789 | 6/2013 |
| JP | 2013-203166 | 10/2013 |

* cited by examiner

*Primary Examiner* — Faye M Fleming
(74) *Attorney, Agent, or Firm* — H.C. Park & Associates, PLC

(57) ABSTRACT

An airbag apparatus in which the deployment pressure is adjustable. A ring portion of the airbag apparatus is formed on a first tether coupled to a front surface of an airbag, and a second tether coupled to a rear surface of the airbag penetrates the ring portion and is coupled to a first vent rate adjusting member and a second vent rate adjusting member.

10 Claims, 8 Drawing Sheets

AIRBAG APPARATUS

CROSS-REFERENCE TO RELATED APPLICATION

The present application claims priority from and the benefit of Korean Patent Application Number 10-2014-0126815, filed on Sep. 23, 2014, which is hereby incorporated by reference for all purposes as if fully set forth herein.

BACKGROUND

1. Field

Exemplary embodiments relate to an airbag apparatus, and more particularly, to an airbag apparatus for a front passenger seat.

2. Discussion of the Background

In general, an airbag is installed in a vehicle in order to protect an occupant seated in a driver seat or a front passenger seat at the time of a vehicle accident using cushioning force.

The airbag is designed so that the airbag is deployed by pressure at which an adult person having a typical weight (for example, 140-180 pounds) may be protected.

Meanwhile, while only adult persons having a typical weight are seated in the driver seat, various other occupants, such as children, and other adult persons having weight less than the typical weight, as well as adult persons having typical weight, may be seated in the front passenger seat.

Therefore, in the case of the airbag for a front passenger seat, it is necessary to vary deployment pressure in accordance with the type of occupant.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an airbag apparatus in which the deployment pressure thereof is adjustable.

Additional aspects will be set forth in the detailed description which follows, and, in part, will be apparent from the disclosure, or may be learned by practice of the inventive concept.

An exemplary embodiment of the present invention discloses, an airbag apparatus including: an airbag configured to be deployable forward toward a passenger when gas flows into the airbag, the airbag having a first vent hole formed in one surface thereof and through which gas is discharged, and a second vent hole formed in the other surface and through which gas is discharged; a first vent rate adjusting member coupled to the airbag while shielding the first vent hole, and configured to adjust an amount of gas that is discharged through the first vent hole; a second vent rate adjusting member coupled to the airbag while shielding the second vent hole, and configured to adjust an amount of gas that is discharged through the second vent hole; a first tether having one end coupled to a front surface of the airbag, and having a ring portion formed at the other end; and a second tether coupled to a rear surface of the airbag, which penetrates the ring portion, and is coupled to the first vent rate adjusting member and the second vent rate adjusting member.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
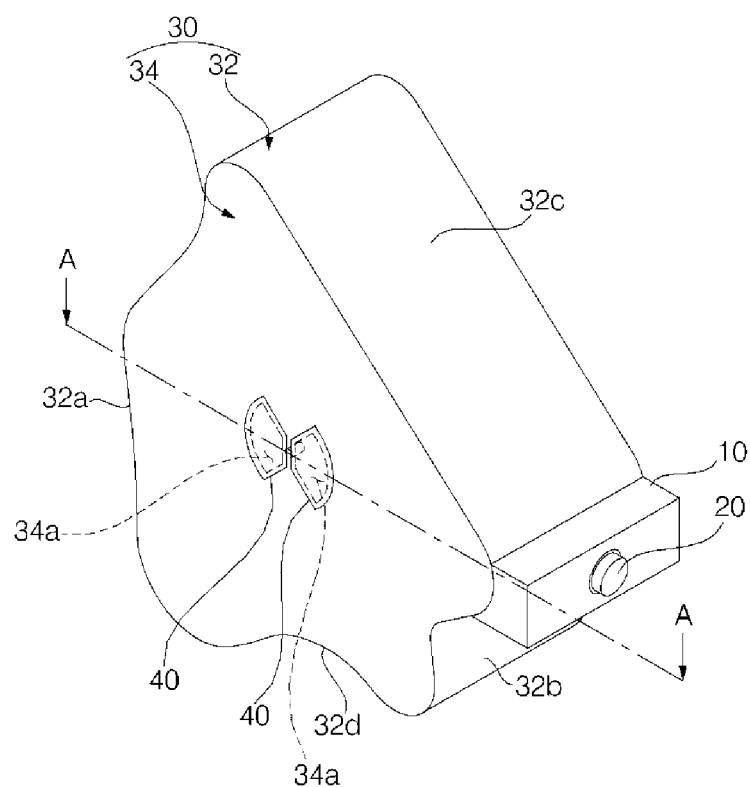
FIG. 1 is a perspective view illustrating a state in which an airbag of an airbag apparatus according to an exemplary embodiment of the present invention is fully inflated.
Figure 2:
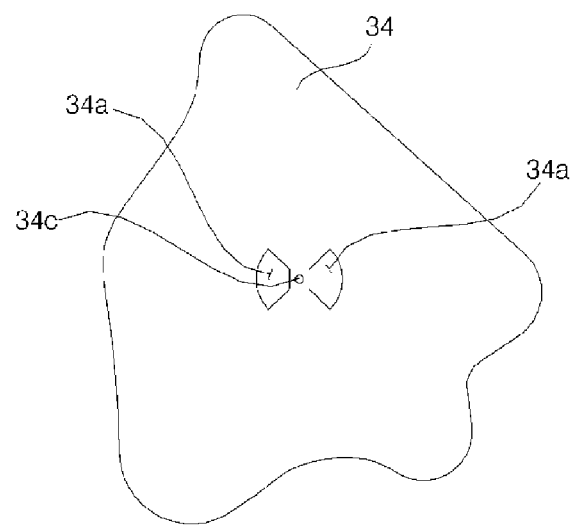
FIG. 2 is a view illustrating a side panel illustrated in FIG. 1.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/ or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, an airbag apparatus according to an exemplary embodiment of the present invention will be described with reference to the drawings.

Referring to FIGS. 1 to 5, an airbag apparatus according to an exemplary embodiment of the present invention includes an airbag housing 10, an inflator 20, and an airbag 30.

The airbag housing 10 accommodates therein the airbag 30 and is then installed in a vehicle body. The airbag apparatus according to the exemplary embodiment of the present invention is an airbag apparatus for a front passenger seat for protecting a passenger seated in the front passenger seat, and the airbag housing 10 may be installed in an instrument panel that is disposed in front of the front passenger seat.

The inflator 20 generates gas so that the airbag 30 may be inflated at the time of a vehicle accident. The interior of the inflator 20 is filled with a gas generating medium that may generate gas, such that the inflator 20 may generate gas when the gas generating medium explodes in response to a control signal from a controller at the time of a vehicle accident.

A head portion of the inflator 20 is inserted into the airbag housing 10 at a lower side (right side in FIG. 1) of the airbag housing 10, and is disposed in the airbag housing 10. Then, the head portion of the inflator 20, which is disposed in the airbag housing 10, is inserted into the airbag 30. The remaining portion of the inflator 20, except for the head portion, may be disposed on an outer surface of the airbag housing 10 and coupled to the airbag housing 10.

The airbag 30 is disposed in the airbag housing 10 in a state in which the airbag 30 is folded, and protrudes toward the outside from the airbag housing 10 while being inflated and unfolded by gas generated by the inflator 20.

The airbag 30 is made of a flexible material that is foldable. The airbag 30 is manufactured using three panels made of a flexible material. That is, the airbag 30 includes a main panel 32, and side panels 34 which are coupled to both sides of the main panel 32, respectively. The airbag 30 may be completely manufactured by forming the main panel 32 in an annular shape, and sewing the side panels 34 at both open sides of the main panel 32. In the following description, the side panel 34 refers to a side surface of the airbag 30.

The airbag 30 is deployed forward toward the passenger while being inflated by gas generated by the inflator 20. The airbag 30 includes a front surface 32a, which is a surface directed toward the passenger; a rear surface 32b, which is a surface opposite the front surface 32a and to which the airbag housing 10 and the inflator 20 are coupled; an upper surface 32c, which connects upper ends of the front surface 32a and the rear surface 32b; and a lower surface 32d, which connects lower ends of the front surface 32a and the rear surface 32b.

Vent holes 34a and 34b are formed in the side panels 34, which are both surfaces of the airbag 30, respectively. Gas flowing into the airbag 30 is discharged to the outside of the airbag 30 through the vent holes 34a and 34b. The vent holes 34a and 34b include a first vent hole 34a formed in the surface of a side panel 34 of the airbag 30, and a second vent hole 34b formed in the surface of the other side panel 34 of the airbag 30.

The number of first vent holes 34a is greater than one. In an exemplary embodiment, there are two first vent holes 34a. The number of second vent holes 34b is also greater than one. In the present exemplary embodiment, there are two second vent holes 34b.

In the side panels 34 that are both surfaces of the airbag 30, a first insertion hole 34c is further formed between the plurality of first vent holes 34a, and a second insertion hole 34d is further formed between the plurality of second vent holes 34b.

The first vent holes 34a and the second vent holes 34b are approximately formed in a fan shape, and the first insertion hole 34c and the second insertion hole 34d are formed in a circular shape. The first vent holes 34a and the second vent holes 34b are formed to be larger than the first insertion hole 34c and the second insertion hole 34d. The first insertion hole 34c and the second insertion hole 34d are sized to allow a second tether 70 to be described below to pass through the first insertion hole 34c and the second insertion hole 34d.

Vent rate adjusting members 40 and 50 are coupled to the outer surface of the airbag 30. The vent rate adjusting members 40 and 50 are made of a flexible material. The vent rate adjusting members 40 and 50 may be made of the same material as the airbag 30.

The vent rate adjusting members 40 and 50 include the first vent rate adjusting member 40, which shields the first vent holes 34a and is coupled to one surface of the airbag 30; and the second vent rate adjusting member 50, which shields the second vent holes 34b and is coupled to the other surface of the airbag 30.

Only a portion of the first vent rate adjusting member 40, which is opposite a portion adjacent to the first insertion hole 34c, may be sewed on and coupled to the airbag 30 using a thread 5, and only a portion of the second vent rate adjusting member 50, which is opposite a portion adjacent to the second insertion hole 34d, may be sewed on and coupled to the airbag 30 using the thread 5.

The first vent rate adjusting member 40 adjusts an amount of gas that is discharged through the first vent holes 34a from the interior of the airbag 30, and the second vent rate adjusting member 50 adjusts an amount of gas that is discharged through the second vent holes 34b from the interior of the airbag 30.

The first vent rate adjusting member 40 is formed to have an area sufficient to shield the first vent hole 34a, and formed to have the same shape as the first vent hole 34a. There is no limitation to the shape of the first vent rate adjusting member 40 as long as the first vent rate adjusting member 40 is capable of shielding the first vent hole 34a. The second vent rate adjusting member 50 is formed to have an area sufficient to shield the second vent hole 34b, and formed to have the same shape as the second vent hole 34b. There is no limitation to the shape of the second vent rate adjusting member 50 as long as the second vent rate adjusting member 50 is capable of shielding the second vent hole 34b.

In the present exemplary embodiment, the number of first vent rate adjusting members 40 is equal to the number of first vent holes 34a. That is, the number of first vent rate adjusting members 40 is two. In addition, the number of second vent rate adjusting members 50 is equal to the number of second vent holes 34b. That is, the number of second vent rate adjusting members 50 is two.

However, even if the number of first vent holes 34a is two, the number of first vent rate adjusting members 40 may be one. That is, the first vent rate adjusting member 40 may be formed as a single member that has an area sufficient to shield the two first vent holes 34a. Further, even if the number of second vent holes 34b is two, the number of second vent rate adjusting members 50 may be one. That is, the second vent rate adjusting member 50 may also be formed as a single member that has an area sufficient to shield the two second vent holes 34b.

A first tether 60 and the second tether 70 are coupled to the interior of the airbag 30. The first tether 60 and the second tether 70 are made of a flexible material. The first tether 60 and the second tether 70 may be made of the same material as the airbag 30.

One end of the first tether 60 is coupled to the front surface 32a of the airbag 30. The one end of the first tether 60 is coupled to a central portion in a left and right direction of the front surface 32a of the airbag 30. A ring portion 62 is formed at the other end of the first tether 60. The ring portion 62 is disposed on a straight line that connects the first insertion hole 34c and the second insertion hole 34d, in a state in which the airbag 30 is fully inflated.

The second tether 70 is coupled to the rear surface 32b of the airbag 30. The second tether 70 is coupled to a central portion in the left and right direction of the rear surface 32b of the airbag 30. The second tether 70 is folded in half based on a longitudinal center, and the folded central portion may be coupled to the rear surface 32b of the airbag 30. The remaining portion, which is not folded, penetrates the ring portion 62 formed on the first tether 60, such that one end of the remaining portion may be coupled to the first vent rate adjusting member 40, and the other end of the remaining portion may be coupled to the second vent rate adjusting member 50.

The second tether 70 may be formed to branch off into three parts based on the ring portion 62 instead of being folded based on a central portion thereof. That is, the second tether 70 may include an insertion portion 72 which is inserted into the ring portion 62 and has one end coupled to the rear surface 32b of the airbag 30, a first coupling portion 74 which extends from the other end of the insertion portion 72 toward one side and is coupled to the first vent rate adjusting member 40, and a second coupling portion 76 which extends from the other end of the insertion portion 72 toward the other side and is coupled to the second vent rate adjusting member 50. In a case in which the second tether 70 is folded in half based on the longitudinal center, a portion where the second tether 70 is folded in half may be the insertion portion 72, and portions where the second tether 70 branches off into two parts from the insertion portion 72 instead of being folded may be the first coupling portion 74 and the second coupling portion 76.

A hole formed in the ring portion 62 is greater than a diameter or a thickness of the second tether 70 so that the second tether 70 may penetrate the hole. Therefore, the ring portion 62 is disposed to be movable in a front and rear direction along the second tether 70.

In a case in which the plurality of first vent rate adjusting members 40 and the plurality of second vent rate adjusting members 50 are provided, respectively, one end of the second tether 70 is inserted into the first insertion hole 34c and then coupled to one side of the plurality of first vent rate adjusting members 40, and the other end of the second tether 70 is inserted into the second insertion hole 34d and then coupled to one side of the plurality of second vent rate adjusting members 50.

In a case in which each of the first vent rate adjusting member 40 and the second vent rate adjusting member 50 is formed as a single member, one end of the second tether 70 is inserted into the first insertion hole 34c and then coupled to a central portion of the first vent rate adjusting member 40, and the other end of the second tether 70 is inserted into the second insertion hole 34d and then coupled to a central portion of the second vent rate adjusting member 50.

The first insertion hole 34c and the second insertion hole 34d each have a sufficient size so that a portion of the first vent rate adjusting member 40, which is coupled to the second tether 70, may pass through the first insertion hole 34c, and a portion of the second vent rate adjusting member 50, which is coupled to the second tether 70, may pass through the second insertion hole 34d.

An operation of the airbag apparatus according to the exemplary embodiment of the present invention, which is configured as described above, will be described below.

The operation of the airbag apparatus according to the exemplary embodiment of the present invention may be classified into three states. That is, the operation is classified into a state in which the airbag 30 is initially deployed, a state in which the airbag 30 is fully inflated, and a state in which the front surface 32a of the airbag 30 is pressed by the passenger after the airbag 30 is fully inflated. Here, the state in which the airbag 30 is initially deployed may mean a state in which the airbag 30 is not fully inflated.

In the state in which the airbag 30 is initially deployed, the first vent holes 34a and the second vent holes 34b are opened. In addition, in the state in which the airbag 30 is fully inflated, the first vent holes 34a and the second vent holes 34b are shielded. In addition, in the state in which the front surface 32a of the airbag 30 is pressed by the passenger after the airbag 30 is fully inflated, the first vent holes 34a and the second vent holes 34b are opened again. The aforementioned states will be described below in detail.

First, the state in which the airbag 30 is initially deployed will be described below.

Figure 6:
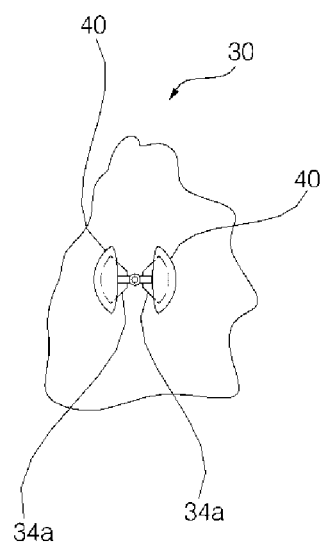
FIG. 6 is a side view illustrating a state in which the airbag is initially deployed.
Figure 7:
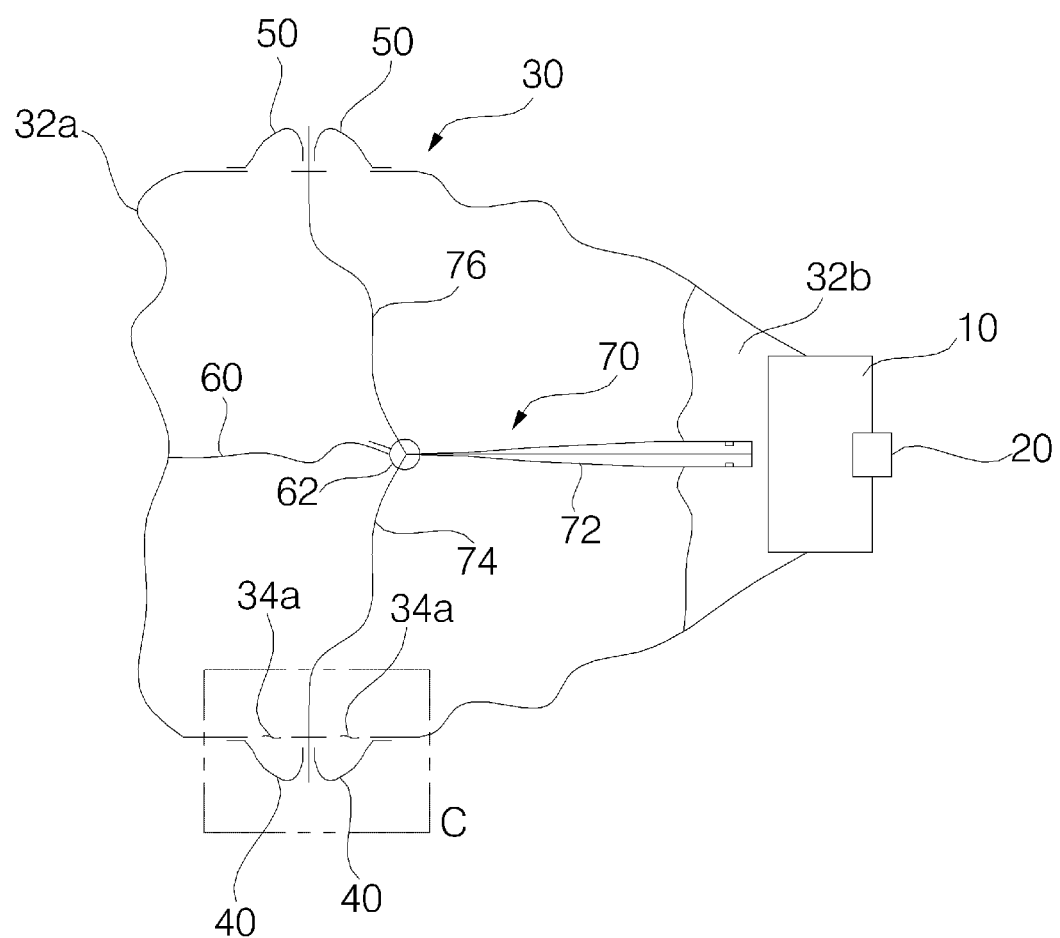
FIG. 7 is a cross-sectional view when viewed from the upper side of FIG. 6.
Figure 8:
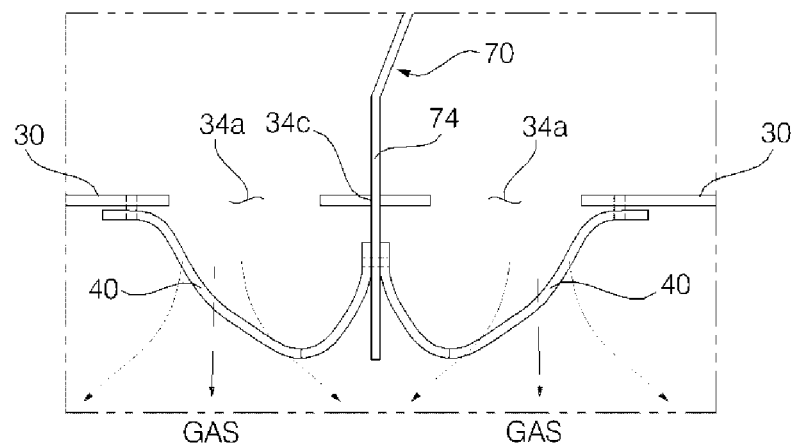
FIG. 8 is an enlarged view of portion C defined by a dotted line of FIG. 7.

Referring to FIGS. 6 to 8, the airbag 30 is wrinkled in the state in which the airbag 30 is initially deployed. Therefore, the first tether 60 and the second tether 70, which are coupled to the airbag 30 inside the airbag 30, are loosened.

When the first tether 60 and the second tether 70 are loosened, as described above, the force of the second tether 70, which pulls the first vent rate adjusting members 40 and the second vent rate adjusting members 50, is weak. Therefore, the first vent rate adjusting members 40 and the second vent rate adjusting members 50 protrude toward the outside of the airbag 30 by gas pressure in the airbag 30. Accordingly, the first vent holes 34a and the second vent holes 34b are opened, such that gas in the airbag 30 passes through the first vent holes 34a and the second vent holes 34b and is then discharged to the outside of the airbag 30.

As described above, according to the airbag apparatus of the exemplary embodiment of the present invention, gas in the airbag 30 is discharged through the first vent holes 34a and the second vent holes 34b in the state in which the airbag 30 is initially deployed, thereby reducing initial deployment pressure of the airbag 30. Accordingly, when a passenger with a non-typical or a weakened body condition (for example, a child) is seated in the front passenger seat, it is possible to prevent such passenger from being injured due to initial deployment pressure of the airbag 30.

Second, the state in which the airbag 30 is fully inflated will be described below.

Referring to FIGS. 1 to 5, as the airbag 30 is inflated, the first tether 60 and the second tether 70 are moved along with the airbag 30 that is being inflated. Thereafter, when the airbag 30 is fully inflated, the first tether 60 and the second tether 70 are tightened.

Figure 3:
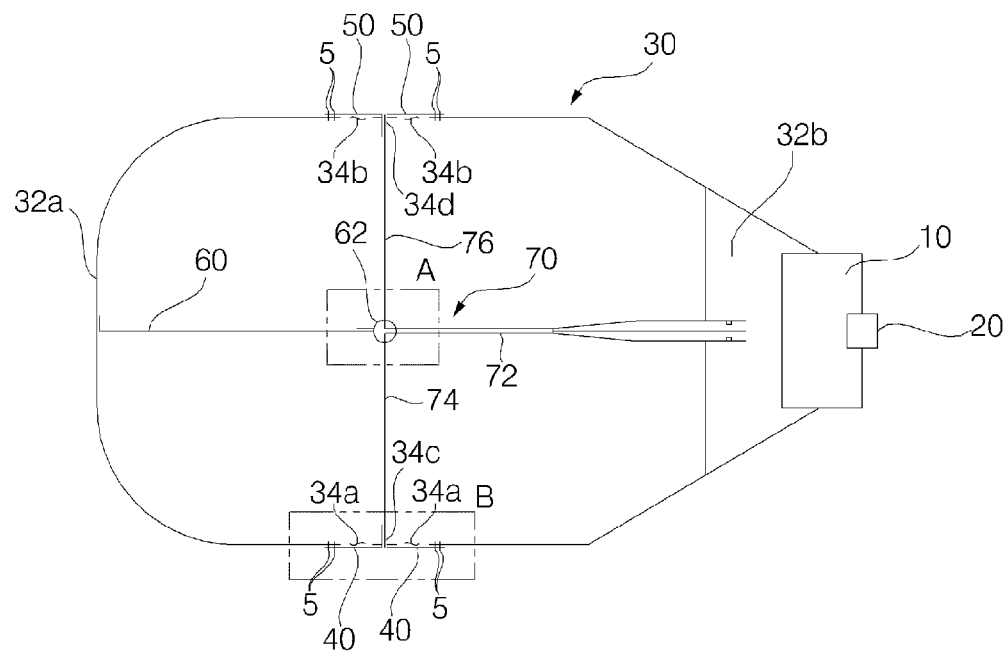
FIG. 3 is a cross-sectional view taken along line A-A of FIG. 1.
Figure 4:
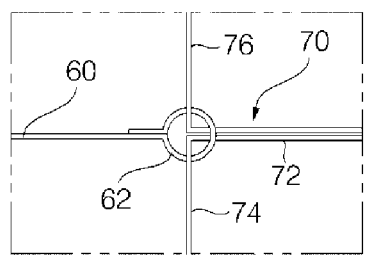
FIG. 4 is an enlarged view of the portion A defined by a dotted line of FIG. 3.
Figure 5:
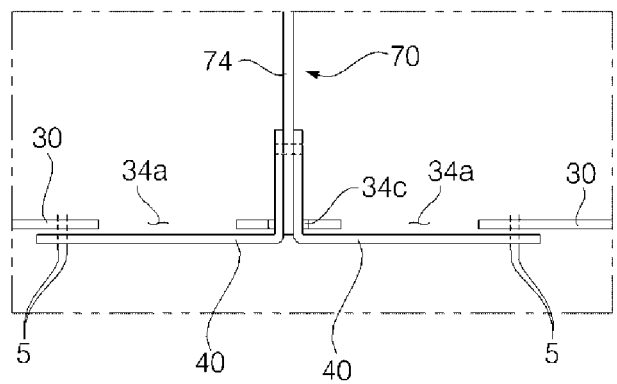
FIG. 5 is an enlarged view of the portion B defined by a dotted line of FIG. 3.

As described above, the ring portion 62 is moved forward along with the second tether 70 in the state in which the airbag 30 is fully inflated, and disposed on a straight line together with the first insertion hole 34c and the second insertion hole 34d, as illustrated in FIG. 3. In the state in which the airbag 30 is fully inflated, as illustrated in FIG. 3, the ring portion 62 pulls the second tether 70 forward. Therefore, the first coupling portion 74 of the second tether 70 pulls the first vent rate adjusting members 40 toward the interior of the airbag 30, and the second coupling portion 76 of the second tether 70 pulls the second vent rate adjusting members 50 toward the interior of the airbag 30. As described above, by force of the second tether 70 that pulls the first vent rate adjusting members 40 and the second vent rate adjusting members 50, the first vent rate adjusting members 40 shield the first vent holes 34a, and the second vent rate adjusting members 50 shield the second vent holes 34b. Therefore, gas in the airbag 30 cannot be discharged to the outside of the airbag 30.

As described above, according to the airbag apparatus according to the exemplary embodiment of the present invention, when the airbag 30 is fully inflated, the first vent holes 34a and the second vent holes 34b are shielded, and as a result, gas in the airbag 30 cannot be discharged to the outside of the airbag 30, such that the airbag 30 may protect the passenger seated in the front passenger seat using appropriate pressure. Accordingly, when a passenger with a typical body weight (for example, an adult person who weighs about 140-180 pounds) is seated in the front passenger seat, the airbag 30 may deploy with deployment pressure that may protect the passenger with the typical body weight.

Third, the state in which the front surface 32a of the airbag 30 is pressed by the passenger after the airbag 30 is fully inflated will be described below.

Figure 9:
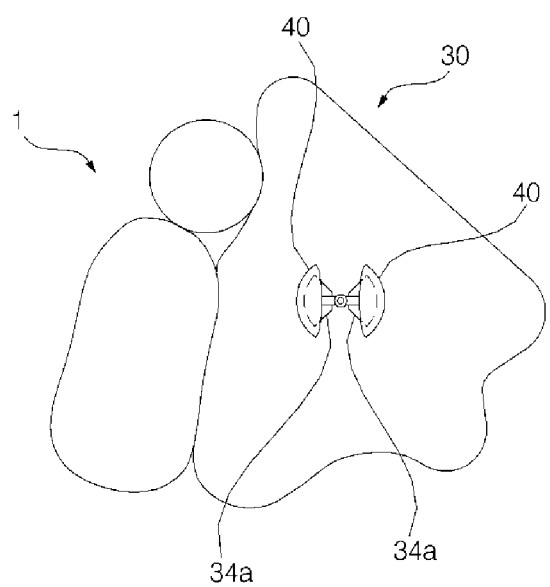
FIG. 9 is a side view illustrating a state in which a front surface of the airbag is pressed by a passenger after the airbag is fully deployed.
Figure 10:
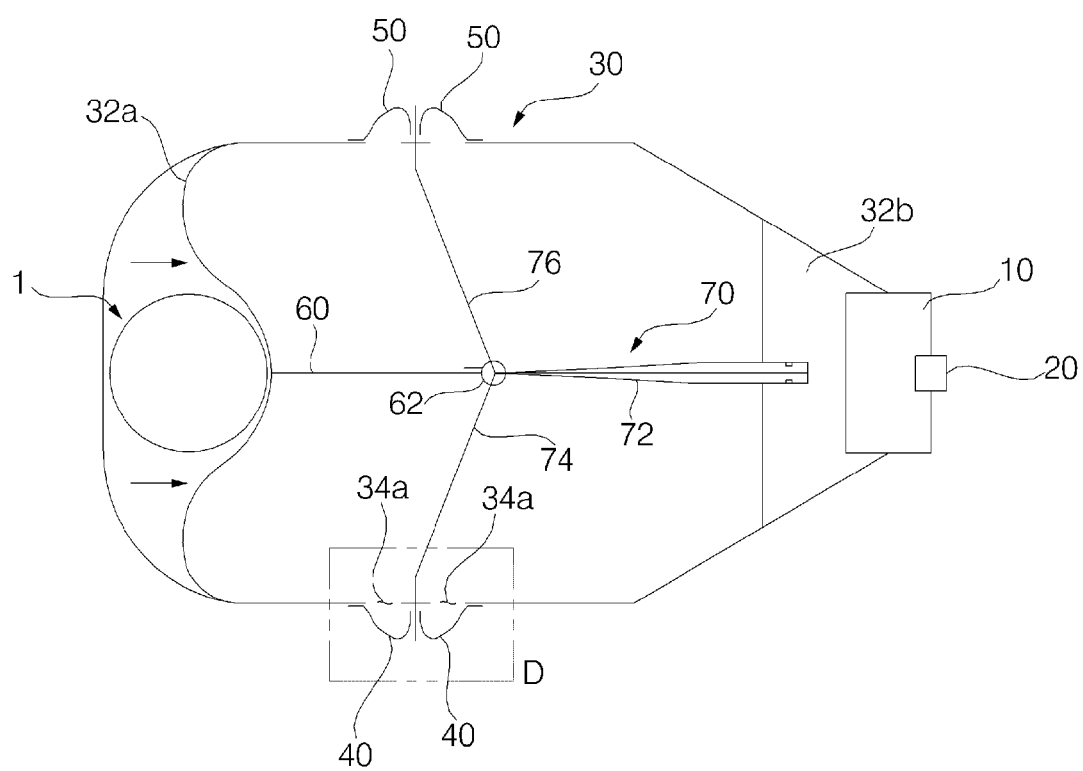
FIG. 10 is a cross-sectional view when viewed from the upper side of FIG. 9.
Figure 11:
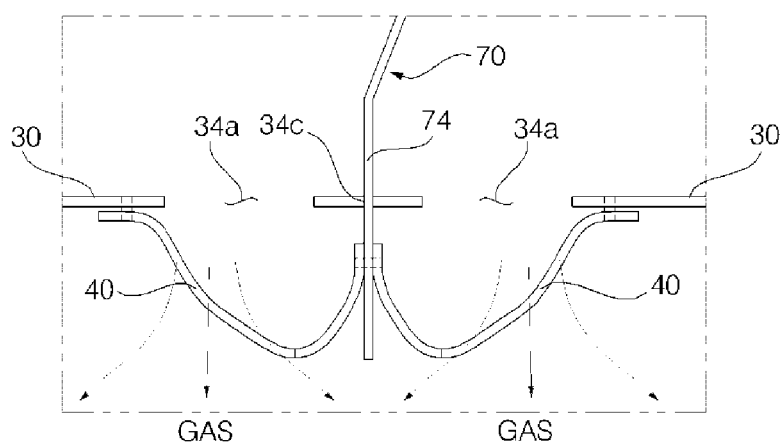
FIG. 11 is an enlarged view of the portion D defined by a dotted line of FIG. 10.

Referring to FIGS. 9 to 11, after the airbag 30 is fully inflated, a head and a chest of a passenger 1 come into contact with the front surface 32a of the airbag 30. Therefore, after the airbag 30 is fully inflated, the front surface 32a of the airbag 30 is pressed by the passenger 1.

When the front surface 32a of the airbag 30 is pressed by the passenger 1 as described above, the front surface 32a of the airbag 30 is moved rearward, and as a result, the first tether 60 is also moved rearward, such that the ring portion 62 is moved rearward along with the insertion portion 72 of the second tether 70. Therefore, because force of the first tether 60 which pulls the first coupling portion 74 and the second coupling portion 76 of the second tether 70 forward is decreased, force of the first coupling portion 74, which pulls the first vent rate adjusting members 40, is decreased, and force of the second coupling portion 76, which pulls the second vent rate adjusting members 50, is decreased. As described above, when force of the second tether 70, which pulls the first vent rate adjusting members 40 and the second vent rate adjusting members 50, is decreased, the first vent rate adjusting members 40 protrude toward the outside of the airbag 30 again by gas pressure in the airbag 30, and the second vent rate adjusting members 50 also protrude to the outside of the airbag 30 again by gas pressure in the airbag 30, such that the first vent holes 34a and the second vent holes 34b are opened again. As a result, gas in the airbag 30 is again discharged to the outside of the airbag 30 through the first vent holes 34a and the second vent holes 34b.

As described above, according to the airbag apparatus according to the exemplary embodiment of the present invention, when the front surface 32a of the airbag 30 is pressed by the passenger after the airbag 30 is fully inflated, gas in the airbag 30 is discharged through the first vent holes 34a and the second vent holes 34b. As a result, the airbag 30 maintains appropriate pressure for protecting the passenger. That is, because the inflator 20 generates a greater amount of gas pressure than is required to fully inflate the airbag 30, gas pressure in the airbag 30 becomes excessively high if gas in the airbag 30 is not discharged to the outside of the airbag 30 after the airbag 30 is fully inflated. Therefore, even though the passenger with a typical body weight is seated in the front passenger seat, the passenger may be injured. However, when the front surface 32a of the airbag 30 is pressed by the passenger after the airbag 30 is fully inflated, gas in the airbag 30 is discharged to the outside of the airbag 30 through the first vent holes 34a and the second vent holes 34b, and as a result, the airbag 30 maintains appropriate pressure for protecting the passenger.

As described above, according to the airbag apparatus according to the present invention, the first vent holes 34a and the second vent holes 34b are opened in the state in which the airbag 30 is initially deployed, thereby preventing the passenger (here, a child) from being injured due to initial deployment pressure of the airbag 30.

In addition, the first vent holes 34a and the second vent holes 34b are shielded when the airbag 30 is fully inflated, and as a result, the airbag 30 may protect the passenger (here, an adult person) using appropriate deployment pressure.

When the front surface 32a of the airbag 30 is pressed by the passenger (here, an adult person) after the airbag 30 is fully inflated, the first vent holes 34a and the second vent holes 34b are opened, and as a result, the airbag 30 may maintain appropriate deployment pressure for protecting the passenger.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An airbag apparatus comprising:
   an airbag configured to be deployable forward toward a passenger when gas flows into the airbag, the airbag comprising a first vent hole formed in one surface thereof and through which gas is discharged, and a second vent hole formed in the other surface and through which gas is discharged;
   a first vent rate adjusting member coupled to the airbag while shielding the first vent hole, the first vent rate adjusting member being configured to adjust an amount of gas that is discharged through the first vent hole;
   a second vent rate adjusting member coupled to the airbag while shielding the second vent hole, the second vent rate adjusting member being configured to adjust an amount of gas that is discharged through the second vent hole;
   a first tether having one end coupled to a front surface of the airbag, and a ring portion formed at the other end; and
   a second tether coupled to a rear surface of the airbag, which penetrates the ring portion, and is coupled to the first vent rate adjusting member and the second vent rate adjusting member.

2. The airbag apparatus of claim 1, wherein:
   a central portion of the second tether is coupled to the rear surface of the airbag;
   one end of the second tether is coupled to the first vent rate adjusting member; and
   the other end of the second tether is coupled to the second vent rate adjusting member.

3. The airbag apparatus of claim 1, wherein the ring portion is configured to be movable along with the second tether.

4. The airbag apparatus of claim 1, wherein the second tether comprises:
   an insertion portion configured to be inserted into the ring portion and coupled to the rear surface of the airbag;
   a first coupling portion extending from the insertion portion toward one side and coupled to the first vent rate adjusting member; and
   a second coupling portion extending from the insertion portion toward the other side and coupled to the second vent rate adjusting member.

5. The airbag apparatus of claim 4, wherein a central portion of the second tether is folded to form the insertion portion.

6. The airbag apparatus of claim 1, wherein the first vent rate adjusting member and the second vent rate adjusting member are disposed outside the airbag, and the first tether and the second tether are disposed inside the airbag.

7. The airbag apparatus of claim 1, further comprising a plurality of the first vent holes and a plurality of the second vent holes, wherein:
   the airbag further comprises a first insertion hole formed between the plurality of first vent holes, and a second insertion hole formed between the plurality of second vent holes;
   one end of the second tether is inserted into the first insertion hole and coupled to the first vent rate adjusting member; and
   the other end of the second tether is inserted into the second insertion hole and coupled to the second vent rate adjusting member.

8. The airbag apparatus of claim 7, wherein, in a state in which the airbag is fully inflated, the ring portion is disposed on a straight line that connects the first insertion hole and the second insertion hole.

9. The airbag apparatus of claim 7, wherein the number of first vent rate adjusting members is equal to the number of first vent holes, and the number of second vent rate adjusting members is equal to the number of second vent holes.

10. The airbag apparatus of claim 1, wherein:
    when the airbag is initially deployed, the first tether and the second tether are loosened, such that the first vent rate adjusting member and the second vent rate adjusting member protrude toward the outside of the airbag by gas pressure in the airbag so as to open the first vent hole and the second vent hole;
    when the airbag is fully inflated, the first tether and the second tether are tightened, such that the first vent rate adjusting member and the second vent rate adjusting member are pulled by the second tether so as to shield the first vent hole and the second vent hole; and
    when the front surface of the airbag is pressed by the passenger after the airbag is fully inflated, force of the first tether which pulls the second tether is decreased while the ring portion is moved rearward, such that the first vent rate adjusting member and the second vent rate adjusting member protrude toward the outside of the airbag by gas pressure in the airbag so as to open the first vent hole and the second vent hole.

* * * * *